US009620969B2

(12) United States Patent
Kobayashi et al.

(10) Patent No.: US 9,620,969 B2
(45) Date of Patent: Apr. 11, 2017

(54) STORAGE BATTERY EQUALIZATION DEVICE CAPABLE OF CHARGING BATTERY PACK INCLUDING STORAGE BATTERY MODULES HAVING DIFFERENT OUTPUT VOLTAGES IN SHORT TIME

(71) Applicant: MITSUBISHI ELECTRIC CORPORATION, Chiyoda-ku (JP)

(72) Inventors: Shoichi Kobayashi, Chiyoda-ku (JP); Takashi Shindoi, Chiyoda-ku (JP); Hiroshi Araki, Chiyoda-ku (JP); Kenji Inomata, Chiyoda-ku (JP); Toshihiro Wada, Chiyoda-ku (JP); Shoji Yoshioka, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 85 days.

(21) Appl. No.: 14/760,659

(22) PCT Filed: Sep. 17, 2013

(86) PCT No.: PCT/JP2013/005466
§ 371 (c)(1),
(2) Date: Jul. 13, 2015

(87) PCT Pub. No.: WO2014/115200
PCT Pub. Date: Jul. 31, 2014

(65) Prior Publication Data
US 2015/0357843 A1  Dec. 10, 2015

(30) Foreign Application Priority Data

Jan. 24, 2013 (JP) ................................ 2013-011363

(51) Int. Cl.
*H02J 7/00* (2006.01)
*B60L 11/18* (2006.01)

(52) U.S. Cl.
CPC .......... *H02J 7/0016* (2013.01); *B60L 11/1866* (2013.01); *H02J 7/0018* (2013.01)

(58) Field of Classification Search
CPC ...... H02J 7/0013; H02J 7/0014; H02J 7/0016; H02J 7/0024
USPC ........................................................ 320/118
See application file for complete search history.

(56) References Cited

U.S. PATENT DOCUMENTS

| | | | | |
|---|---|---|---|---|
| 2002/0158329 A1* | 10/2002 | Kimura | .................. | H01G 4/228 257/703 |
| 2005/0212493 A1* | 9/2005 | Yamaguchi | ........... | H02J 7/0024 320/166 |
| 2010/0141220 A1* | 6/2010 | Abe | .................. | H02M 3/33569 320/167 |
| 2010/0148726 A1 | 6/2010 | Lee et al. | | |
| 2010/0231167 A1 | 9/2010 | Ohnuki | | |
| 2011/0234162 A1* | 9/2011 | Kinoshita | ........... | H01M 10/441 320/116 |
| 2012/0200163 A1* | 8/2012 | Ito | ....................... | H01M 10/441 307/77 |
| 2012/0299557 A1* | 11/2012 | Kwon | ..................... | H02J 5/005 320/166 |

FOREIGN PATENT DOCUMENTS

| | | |
|---|---|---|
| JP | 2010 529817 | 8/2010 |
| JP | 2011 67021 | 3/2011 |
| JP | 2012 39815 | 2/2012 |

OTHER PUBLICATIONS

International Search Report Issued Dec. 3, 2013 in PCT/JP2013/005466 Filed Sep. 17, 2013.
Daowd, M. et al., "Passive and Active Battery Balancing comparison based on MATLAB Simulation", Vehicle Power and Propulsion Conference (VPPC), IEEE, 2011 (7 Pages).

* cited by examiner

*Primary Examiner* — Arun Williams
(74) *Attorney, Agent, or Firm* — Oblon, McClelland, Maier & Neustadt, L.L.P.

(57) ABSTRACT

A storage battery equalization device is provided with: a battery pack including a plurality of storage battery modules; a plurality of equalization circuits corresponding to the respective storage battery modules, each including a DC/AC mutual converter circuit, a variable capacitor, and a transformer; external wirings interconnecting secondary windings of the transformers; voltage monitors each being connected across both electrodes of a corresponding storage battery module; and an equalization control unit. The equalization control unit determines equalization groups, each including one or more storage battery modules for discharging and one or more storage battery modules for charging, sets one of electrostatic capacitance values to the variable capacitors for each equalization group, the electrostatic capacitances corresponding to resonance frequencies of the equalization circuits, and controls a frequency of an alternating current outputted from the DC/AC mutual converter circuit of each equalization circuit, to be the resonance frequency of the equalization circuit.

8 Claims, 12 Drawing Sheets

STORAGE BATTERY EQUALIZATION DEVICE CAPABLE OF CHARGING BATTERY PACK INCLUDING STORAGE BATTERY MODULES HAVING DIFFERENT OUTPUT VOLTAGES IN SHORT TIME

TECHNICAL FIELD

The present invention relates to a battery pack including a plurality of storage battery modules connected in series, and also relates to a storage battery equalization device that equalizes charge states across the storage battery modules.

BACKGROUND ART

Automobiles and rail cars, which use electricity as an energy source, require a high voltage in order to drive their electric motors. Therefore, a plurality of storage battery cells are connected in series to configure a storage battery module, and further, a plurality of such storage battery modules are connected in series to configure a battery pack, and the battery pack is used.

Such storage battery cells have so-called battery characteristics, such as output voltage, and charge and discharge characteristics, the battery characteristics being different from each other, due to manufacturing variations, etc. Therefore, the storage battery modules, each being an assembly of those storage battery cells, also have battery characteristics different from each other.

When charging a battery pack including storage battery modules each having different battery characteristics, a storage battery module having a high output voltage and being charged more than the others reaches a charge limit earlier. If further continuing to charge this storage battery module, the storage battery module is overcharged, resulting in deterioration of the battery characteristics. Therefore, it is necessary to stop charging when the storage battery module having the highest output voltage and being the most charged in the battery pack reaches the charge limit. In this case, it is not possible to continue to charge the other storage battery modules until these other storage battery modules reach the charge limits.

On the other hand, when discharging, a storage battery module having a low output voltage and being less charged reaches the discharge limit earlier. If further continuing to discharge this storage battery module, it results in deterioration of the battery characteristics. Therefore, it is necessary to stop discharging when the storage battery module having the lowest output voltage and being the least charged in the battery pack reaches the discharge limit. In this case, it is not possible to continue to discharge the other storage battery modules until these other storage battery modules reach the discharge limits.

That is, when the storage battery modules forming the battery pack have different output voltages and different charge states, it is not possible to fully charge all the storage battery modules during the charging process, and fully discharge all the storage battery modules during the discharging process. In other words, since the storage battery modules forming the battery pack have different battery characteristics from each other, it is not possible to fully use the battery characteristics inherent in the battery pack. Therefore, in order to improve the battery characteristics of the storage battery modules, it is important to eliminate differences in charge states of the storage battery modules forming the battery pack, and to equalize the battery characteristics such as output voltage.

Conventionally, various methods are proposed for eliminating differences in battery characteristics of storage battery modules forming a battery pack (for example, Non-Patent Document 1). Patent Document 1 discloses an equalization device provided with intra-module electric charge equalizing units and an inter-module electric charge equalizing unit. According to Patent Document 1, in a battery pack provided with N storage battery modules connected in series each of which includes M storage battery cells connected in series, each of the intra-module electric charge equalizing units equalizes output voltages of the M storage battery cells, and the inter-module electric charge equalizing unit equalizes output voltages of the N storage battery modules.

The storage battery equalization device disclosed in Patent Document 1 is configured to discharge all the storage battery modules and to charge only selected storage battery modules. That is, all the storage battery modules forming the battery pack equally discharge energy to lower the charge state, and the discharged energy is accumulated in a reactor connected to the selected storage battery module and is used for charging.

By selecting storage battery modules having output voltages lower than an average voltage among the N storage battery modules, it is possible to charge the selected storage battery modules and discharge the other storage battery modules, thus equalizing voltages of the storage battery modules forming the battery pack.

CITATION LIST

Patent Documents

PATENT DOCUMENT 1: Japanese Paten laid-open Publication No. 2010-529817 A

Non-Patent Documents

NON-PATENT DOCUMENT 1: Mohamed Daowd, et. al, "Passive and Active Battery Balancing comparison based on MATLAB Simulation", Vehicle Power and Propulsion Conference (VPPC), 2011 IEEE.

SUMMARY OF INVENTION

Technical Problem

In such a storage battery equalization device, it is possible to equalize storage battery modules forming a battery pack, by forming a plurality of groups each including storage battery modules having charge states similar to each other, and by iterating a charging process for every group in accordance with the charge states of the storage battery modules forming each group.

However, according to this storage battery equalization device, it is possible to equalize only one group of storage battery modules at a time. Therefore, when a plurality of groups of storage battery modules are formed, the equalization process needs to be iterated multiple times corresponding to the number of the groups. The equalization process for one group requires, in general, several tens of minutes, which vary depending on differences of the output voltages of the groups of storage battery modules. Therefore, when equalizing the plurality of groups, it may take ten hours to several tens of hours, that is, there is a problem that it takes very long time.

The present invention is provided to solve the problem as mentioned above, and intended to obtain a storage battery equalization device capable of simultaneously equalizing a plurality of groups of storage battery modules, each group including a storage battery module having a high output voltage and a storage battery module having a low output voltage, among storage battery modules forming a battery pack, without electrical switching, etc., thus significantly reducing the time required for the equalization.

Solution to Problem

A storage battery equalization device according to the present invention is provided with: a battery pack including a plurality of storage battery modules connected in series, each of the plurality of storage battery modules including at least one storage battery cell; a plurality of equalization circuits corresponding to the respective storage battery modules, each of the plurality of equalization circuits provided with a DC/AC mutual converter circuit connected in parallel to a corresponding one of the storage battery modules, a variable capacitor connected to the DC/AC mutual converter circuit, and a transformer having a primary winding connected in series or parallel to the variable capacitor; external wirings interconnecting secondary windings of the transformers in parallel to each other; voltage monitors, each of the voltage monitors being connected across both electrodes of a corresponding one of the storage battery modules; and an equalization control unit. The equalization control unit determines equalization groups based on voltage values measured by the voltage monitors, each of the equalization groups including one or more storage battery modules for discharging and one or more storage battery modules for charging. Further, the equalization control unit sets, for each of the equalization groups, one of electrostatic capacitance values to the variable capacitors of the equalization circuits connected to the storage battery modules belonging to the equalization group, the electrostatic capacitance values corresponding to resonance frequencies of the equalization circuits, the resonance frequencies being different for the equalization groups. Further, the equalization control unit controls a frequency of an alternating current outputted from the DC/AC mutual converter circuit of each of the equalization circuits, to be the resonance frequency of the equalization circuit.

Advantageous Effects of Invention

The storage battery equalization device according to the present invention can simultaneously equalize the storage battery modules of the plurality of equalization groups, and can equalize the battery pack including the plurality of storage battery modules, in a short time.

DESCRIPTION OF EMBODIMENTS

In the descriptions of embodiments and the drawings, components followed by the same reference sign shall indicate the same or corresponding components. In addition, in the descriptions of embodiments, a single storage battery is called a storage battery cell, a plurality of storage battery cells in a state that they are connected in series are called a storage battery module, and a plurality of storage battery modules in a state that they are connected in series are called a battery pack.

Embodiment 1

Configuration of Storage Battery Equalization Device

Figure 1:
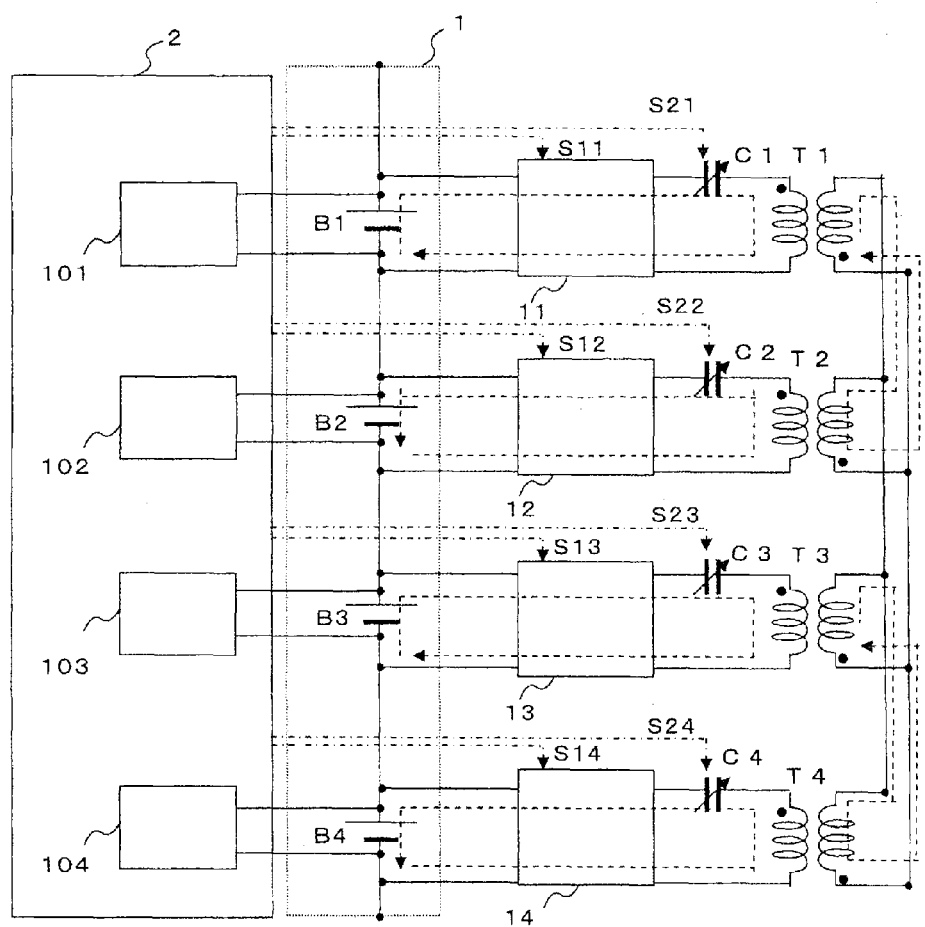
FIG. 1 is a drawing showing one example of a configuration according to Embodiment 1 of the present invention.

FIG. 1 is a drawing showing one example of a configuration of a storage battery equalization device according to Embodiment 1 of the present invention. Hereinafter, with reference to the drawings, the configuration of the storage battery equalization device according to the present invention will be described. In the present embodiment, the configuration and operation of the storage battery equalization device are described by taking an example of a configuration employing four storage battery modules each including a plurality of storage battery cells. However, a number of storage battery modules forming a battery pack may be determined according to a required output voltage.

Four storage battery modules B1 to B4 are connected in series to form a battery pack. Circuits each including one of DC/AC mutual converter circuits 11 to 14, one of variable capacitors C1 to C4, and one of transformers T1 to T4 are connected in parallel with the battery pack, and these circuits are connected to the storage battery modules, respectively. Primary windings of the transformers T1 to T4 are connected in series to the variable capacitors C1 to C4, respectively. Secondary windings of the transformers T1 to T4 are arranged with a polarity opposite to that of the respective primary windings, in a so-called flyback manner. The secondary windings are interconnected by external wirings such that electrodes of the secondary windings, having the same polarity, are connected with each other. The turns ratio of the primary winding and the secondary winding of each of the transformers T1 to T4 is 1:1.

Here, the DC/AC mutual converter circuits 11 to 14 are not necessary to be the same as a conventional DC/AC converter circuit. Each of the DC/AC mutual converter circuits 11 to 14 is a circuit characterized by mutually converting direct current and alternating current, that is, converting an inputted direct current into an alternating current, and conversely, when an alternating current is inputted, converting the alternating current into a direct current to output the direct current. In the descriptions of the present invention, the circuits each including one of the DC/AC mutual converter circuits 11 to 14, one of the variable capacitors C1 to C4, and one of the transformers T1 to T4, and each being connected in parallel with a connection of the battery pack including the storage battery modules connected in series, are called equalization circuits.

Further, the storage battery modules B1 to B4 are provided with voltage monitors 101 to 104, respectively, and provided with an equalization control unit 2 that outputs control signals to the DC/AC mutual converter circuits 11 to 14 and to the variable capacitors C1 to C4 for storage battery equalization, based on measurement results obtained by the voltage monitors 101 to 104.

<Operation of Storage Battery Equalization Device>

Figure 2:
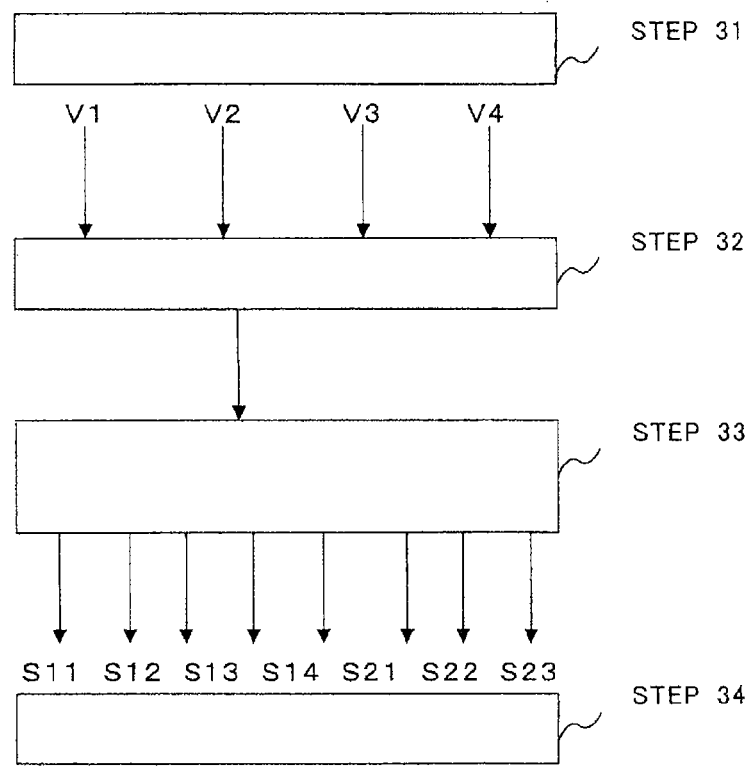
FIG. 2 is a flowchart showing operation of an equalization control unit according to Embodiment 1 of the present invention.

FIG. 2 is a flowchart showing operation of the equalization control unit 2. Input and output of the signals according to the flowchart of FIG. 2 are indicated in FIG. 1 by dashed and dotted lines, directions of the currents according to the flowchart of FIG. 2 are indicated in FIG. 1 by dashed lines. Output voltages V1 to V4 of the storage battery modules B1 to B4 are measured by using the respective voltage monitors 101 to 104 which are connected to the storage battery modules B1 to B4, respectively (Step 31). Based on the measurement results of the output voltages V1 to V4, equalization groups are determined by selecting storage battery modules having high output voltages and storage battery modules having low output voltages (Step 32). The method for determining the equalization groups of the storage battery modules will be described with reference to FIG. 3.

After determining the equalization groups, equalization electrostatic capacitance signals S21 to S24 are outputted for adjusting the variable capacitors C1 to C4 of the equalization circuits connected in parallel to the battery pack including the storage battery modules B1 to B4 connected in series, and for setting electrostatic capacitance values to the respective variable capacitors C1 to C4 such that the equalization circuits for the storage battery modules belonging to the same equalization group have the same resonance frequency, and simultaneously, equalization frequency signals S11 to S14 are generated and outputted to the DC/AC mutual converters 11 to 14 for setting the same resonance frequency to the circuits connected to the storage battery modules forming each group (Step 33). Subsequently, discharging and charging are performed (Step 34).

Figure 3:
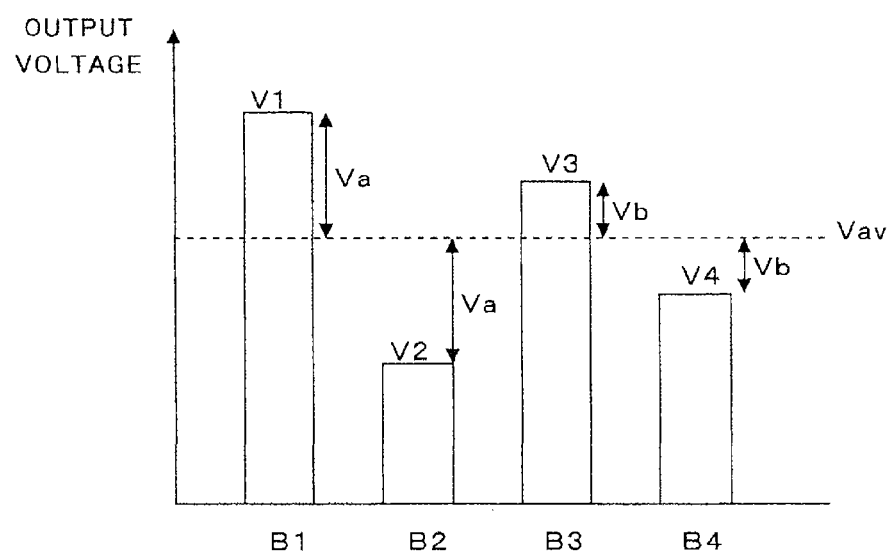
FIG. 3 is a drawing showing one example of relations among output voltages according to Embodiment 1 of the present invention.

FIG. 3 shows one example of the output voltages V1 to V4 of the storage battery modules B1 to B4, respectively, by using a bar chart. A dashed line Vav indicates an average voltage of all the output voltages V1 to V4, and is used as a reference voltage when comparing the output voltages of the storage battery modules B1 to B4 with each other. According to FIG. 3, the output voltage V1 of the storage battery module B1 is higher than the reference voltage by a voltage Va, and the output voltage V2 of the storage battery module B2 is lower than the reference voltage by Va. In addition, the output voltage V3 of the storage battery module B3 is higher than the reference voltage by Vb, and the output voltage V4 of the storage battery module B4 is lower than the reference voltage by Vb.

In this example, the differences of the output voltages of the storage battery modules B1 and B2 from the reference voltage are the same with each other, and the differences of the output voltages of the storage battery modules B3 and B4 from the reference voltage are the same with each other. By discharging one storage battery module and simultaneously charging the other one storage battery module, it is possible for both the storage battery modules to have the same output voltage equal to the reference voltage. Therefore, the storage battery modules B1 and B2 are determined as an equalization group, and the storage battery modules B3 and B4 are determined as an equalization group.

Figure 4:
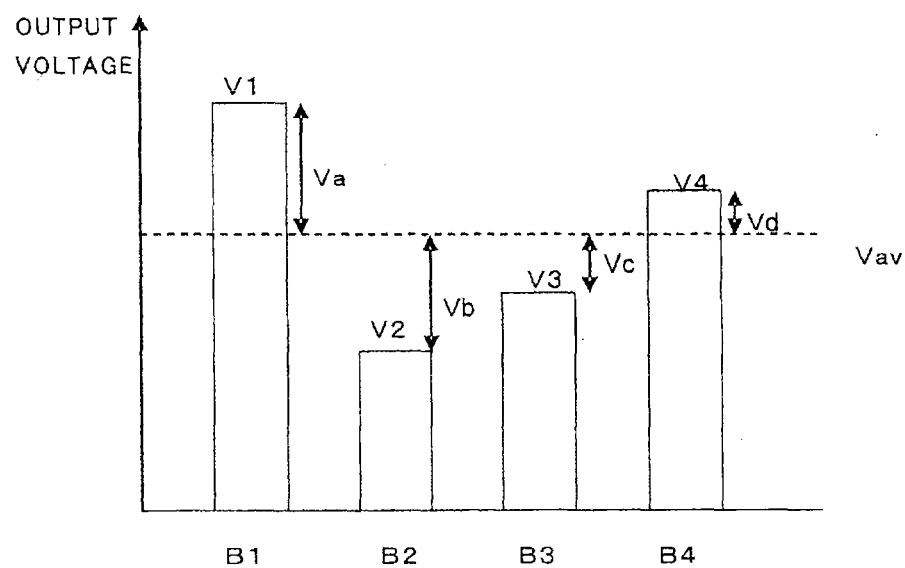
FIG. 4 is a drawing showing one example of relations among output voltages according to Embodiment 1 of the present invention.

For example, how to form equalization groups is described by using another example. FIG. 4 shows another example of the output voltages V1 to V4 of the storage battery modules B1 to B4, respectively, by using a bar chart. A dashed line Vav indicates an average voltage of all the output voltages V1 to V4, and is used as a reference voltage when comparing the output voltages of the storage battery modules B1 to B4 with each other. According to FIG. 4, the output voltage V1 of the storage battery module B1 is higher than the reference voltage by a voltage Va, and the output voltage V2 of the storage battery module B2 is lower than the reference voltage by a voltage Vb. In addition, the output voltage V3 of the storage battery module B3 is lower than the reference voltage by a voltage Vc, and output voltage V4 of the storage battery module B4 is higher than the reference voltage by a voltage Vd. Here, it is assumed that relations Va>Vb>Vc>Vd and Va−Vb−Vc+Vd=0 hold.

One example of how to form equalization groups in this situation is described as follows. In a first stage, the storage battery modules B1 and B2 are determined as an equalization group, and the storage battery modules B3 and B4 are determined as an equalization group. In the group of the storage battery modules B1 and B2, since the relation Va>Vb holds, the output voltage V2 of the storage battery module B2 becomes equal to Vav when the output voltages change by Vb. At this time, the output voltage V1 of the storage battery module B1 is higher than Vav by Va−Vb. Similarly, in the group of the storage battery modules B3 and B4, since the relation Vc>Vd holds, the output voltage V4 of the storage battery module B4 becomes equal to Vav when the output voltages change by Vd. At this time, the output voltage V3 of the storage battery module B3 is lower than Vav by Vc−Vd.

In a second stage, the storage battery modules B1 and B3 are determined as an equalization group. Since a relation Va−Vb=Vc−Vd holds, the output voltage V1 of the storage battery module B1 and the output voltage V3 of the storage battery module B3 become equal to Vav, respectively, when the output voltages change by Va−Vb. As described above, it is possible to equalize the output voltages V1 to V4 of the storage battery modules B1 to B4 by dividing the equalization process into the two stages and determining different equalization groups for each stage.

Figure 5:
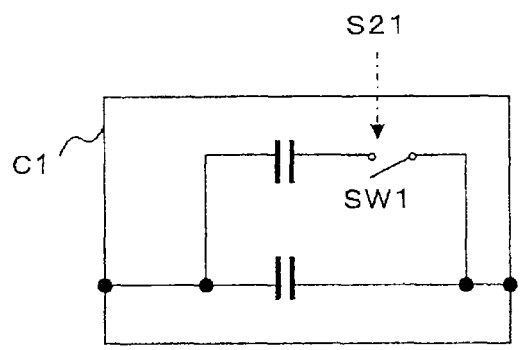
FIG. 5 is a drawing showing one example of a configuration of a variable capacitor according to Embodiment 1 of the present invention.

Each of the variable capacitors C1 to C4, for example, as shown in FIG. 5, is configured as a capacitor group into which a capacitor(s) can be added in parallel. The electrostatic capacitance values of variable capacitors C1 to C4 are adjusted by opening and closing capacitor switches SW1 to SW4, respectively, based on the equalization electrostatic capacitance signals S21 to S24 outputted from the equalization control unit 2, such that the same resonance frequency is set to the equalization circuits for the storage battery modules belonging to the same equalization group, among the storage battery modules B1 to B4. Each value of the resonance frequencies can be calculated from the following Equation (1).

$$\text{Resonance Frequency(Hz)} = \frac{1}{2\pi \times \sqrt{\text{Electrostatic Capacitance}(F) \times \text{Inductance}(H)}} \quad \text{Equation (1)}$$

Figure 6:
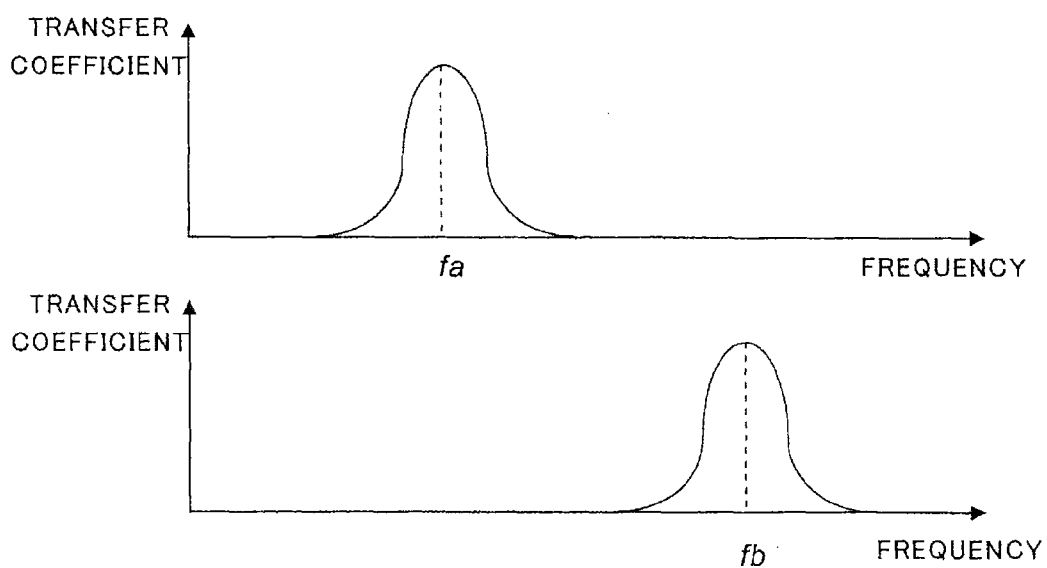
FIG. 6 is drawing for describing a relation between resonance frequencies according to Embodiment 1 of the present invention.

FIG. 6 shows a relation between resonance frequencies fa and fb. The inductances of the primary windings of the transformer T1 to T4 included in the equalization circuits for the storage battery modules B1 to B4 are equal to each other. Therefore, it is possible to set the same resonance frequency to the equalization circuits belonging to the same equalization group, by setting the same electrostatic capacitance Ca to the variable capacitors C1 and C2 to set a resonance frequency fa, and setting the same electrostatic capacitance Cb to the variable capacitors C3 and C3 to set a resonance frequency fb.

In this state, an electromotive force having the voltage V1 and the frequency fa is induced in the secondary winding of the transformer T1. Since the secondary windings of the transformer T1 to T4 are connected in parallel to each other, the voltage with the frequency fa and the electromotive force V1 induced in the secondary winding of the transformer T1 is equally applied to the secondary windings of the transformers T2 to T4, and generates an electromotive force only in the primary winding of the transformer T2 of the equalization circuit having the same resonance frequency and belonging to the same equalization group. Similarly, an electromotive force of the secondary winding of the transformer T2 generates an electromotive force only in the primary winding of the transformer T1. Similarly, an electromotive force of the secondary winding of the transformer T3 generates an electromotive force only in the primary winding of the transformer T4, and an electromotive force of the secondary winding of the transformer T4 generates an electromotive force only in the primary winding of the transformer T3. It is important to set the resonance frequencies not to overlap with each other, as shown in FIG. 6, in order to prevent generating an electromotive force in equalization circuits having a different resonance frequency.

In the equalization circuits having the same frequency and belonging to the same equalization group as mentioned above, their transformers mutually generate electromotive forces, that is, the transformers T1 and T2 mutually generate electromotive force, and the transformers T3 and T4 mutually generate electromotive force, and therefore, currents for equalization flow due to differences between the electromotive forces. In the case of the present embodiment, a current flows in such a direction that the storage battery module B1 having a large electromotive force charges the storage battery module B2 having a small electromotive force, and a current flows in such a direction that the storage battery module B3 having a large electromotive force charges the storage battery module B4 having a small electromotive force. Therefore, it is possible to simultaneously equalize the storage battery modules B1 to B4 forming the respective equalization groups.

In the present Embodiment, one equalization group is formed by selecting one storage battery module having a higher voltage than the reference voltage, and one storage battery module having a lower voltage than the reference voltage. However, one equalization group may be formed by extracting a plurality of storage battery modules having higher voltages than the reference voltage, and a plurality of storage battery modules having lower voltages than the reference voltage. In addition, the voltages may be equalized by dividing the equalization process into several stages and determining different equalization groups for each stage.

Embodiment 2

Figure 7:
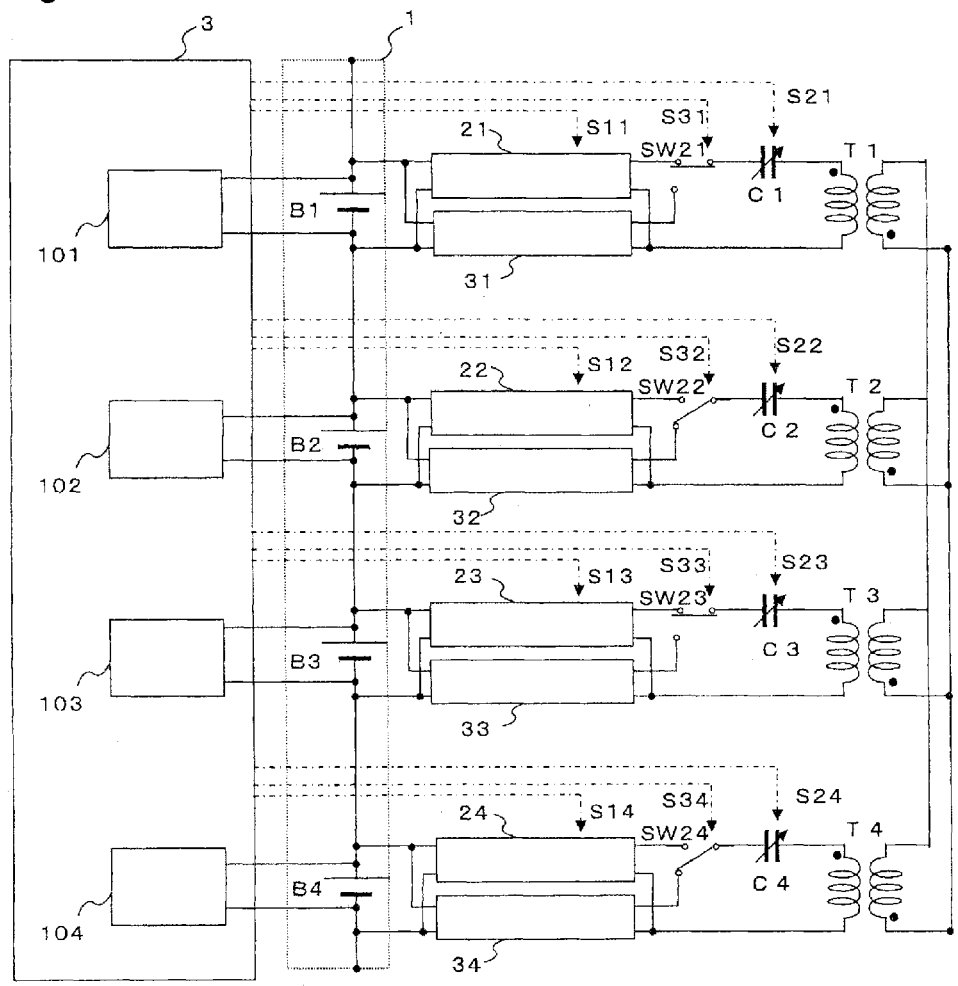
FIG. 7 is a drawing showing one example of a configuration of an equalization device according to Embodiment 2 of the present invention.

FIG. 7 shows a configuration of a storage battery equalization device according to Embodiment 2. Also in the present embodiment, a battery pack including four storage battery modules B1 to B4 connected in series is shown as an example, but it is not limited thereto. It is possible to use Any number of the storage battery cells forming each of the storage battery modules B1 to B4, and use any number of the storage battery modules B1 to B4 forming the battery pack.

The storage battery equalization device described in Embodiment 1 uses the DC/AC mutual converter circuits 11 to 14 characterized by converting an inputted direct current into an alternating current, and conversely, when an alternating current is inputted, converting the alternating current into a direct current to output the direct current. On the other hand, the storage battery equalization device according to the present embodiment differs from that of Embodiment 1 in that DC/AC converter circuits 21 to 24 and AC/DC converter circuits 31 to 34 are arranged in parallel with each other, respectively, and one of the DC/AC converter circuit and the corresponding AC/DC converter circuit is selected and connected by a corresponding one of changeover switches SW21 to SW24, respectively, for the DC/AC converter circuits 21 to 24 and the AC/DC converter circuits 31 to 34. The DC/AC converter circuits 21 to 24 are used for converting inputted direct currents into alternating currents, and the AC/DC converter circuits 31 to 34 are used for conversely converting inputted alternating currents into direct currents to output the direct currents. The Other portions are configured essentially in the same manner as that of Embodiment 1. In addition, it is assumed in descriptions of the present embodiment that output voltages of the storage battery modules are ordered as shown in FIG. 3, in a manner similar to that of Embodiment 1.

Figure 8:
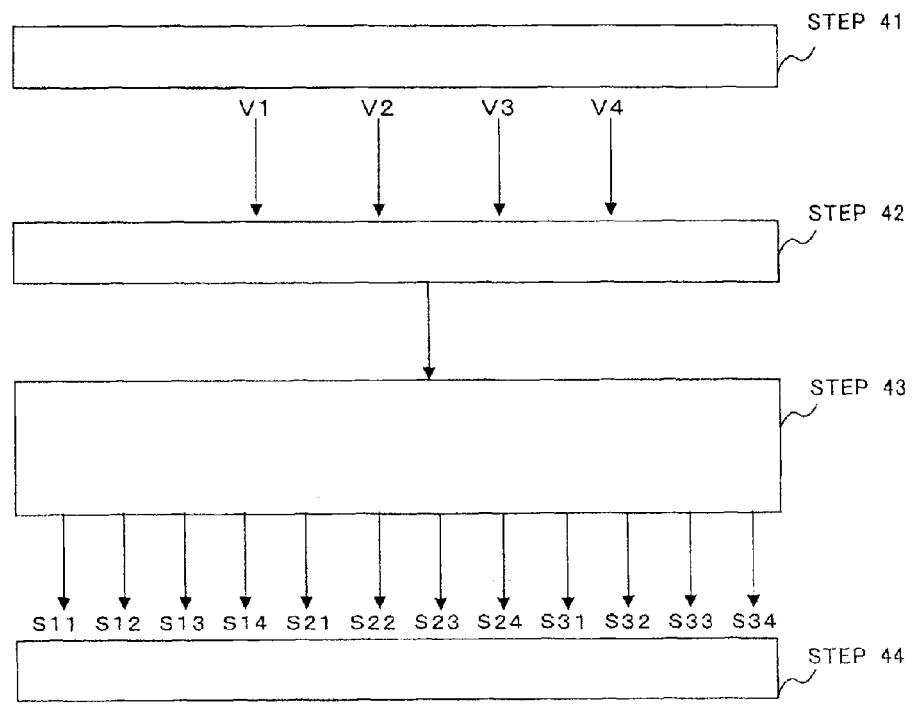
FIG. 8 is a flowchart showing operation of an equalization control unit according to Embodiment 2 of the present invention.

FIG. 8 is a flowchart showing operation of the equalization control unit 3. Input and output of signals according to the flowchart of FIG. 8 are indicated in FIG. 7 by dashed and dotted lines. Output voltages of the storage battery modules B1 to B4 are measured by using the voltage monitors 101 to 104 (Step 41), respectively, and then, equalization groups are determined in a manner similar to that of Embodiment 1 (Step 42).

Subsequently, the equalization electrostatic capacitance signals S21 to S24 are generated for adjusting the variable capacitors C1 to C4, the equalization frequency signals S11 to S14 are generated for setting the same resonance frequency to equalization circuits connected to the storage battery modules belonging to the same equalization group, the equalization switching signals S31 to S34 are generated, and the generated signals are outputted to respective circuits, etc. (Step 43). The equalization switching signals S31 to S34 turn the changeover switch SW21 and SW23 to the DC/AC converter circuits 21 and 23 for the storage battery modules B1 and B3 having higher output voltages than the average voltage Vav of the storage battery modules B1 to B4, and turn the changeover switch SW22 and SW24 to the AC/DC converter circuits 32 and 34 for the storage battery modules B2 and B4 having lower output voltages than the average voltage Vav Subsequently, discharging and charging are performed (Step 44).

With reference to FIG. 7, operation of the storage battery equalization device is described as follows. The equalization switching signals S31 to S34 are outputted from the equalization control unit 3 to the changeover switches SW21 to SW24, respectively, such that for the respective equalization groups, the DC/AC converter circuits 21 and 23 are selected when the storage battery modules have higher output voltages than the reference voltage, and the AC/DC converter circuits 32 and 34 are selected when the storage battery modules have lower output voltages than the reference voltage. In addition, the equalization frequency signals S11 to S14 are outputted to the DC/AC converter circuits 21 and 24 and to the AC/DC converter circuits 31 to 34, respectively, and the equalization electrostatic capacitance signals S21 to S24 are outputted to the variable capacitors C1 to C4, respectively, so that the resonance frequencies of the equalization circuits including the storage battery modules B1 and B2 are the same with each other, and so that the resonance frequencies of the equalization circuits including the storage battery modules B3 and B4 are the same with each other.

Figure 9:
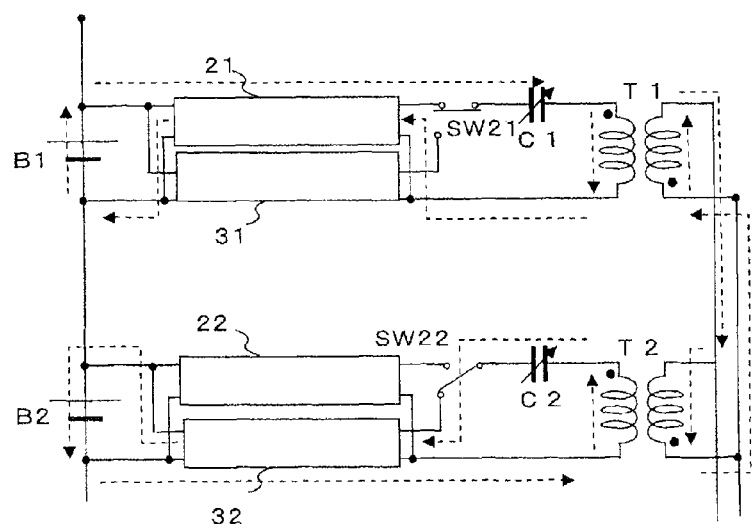
FIG. 9 is a drawing showing a part of the equalization device according to Embodiment 2 of the present invention.

FIG. 9 shows only a part including the storage batteries B1 and B2, which form one equalization group, of the storage battery equalization device shown in FIG. 7. FIG. 9 shows directions of currents by dashed lines for specifically describing how to charge and discharge by selecting the converter circuits using the switches, and by setting the resonance frequencies, in accordance with signals (not shown) from the equalization control unit 3.

Between the two storage battery modules B1 and B2 shown in FIG. 9, the output voltage of the storage battery module B1 is higher than that of the storage battery module B2. Therefore, the changeover switch SW21 is turned to the DC/AC converter circuit 21 in the equalization circuit including the storage battery module B1, and the changeover switch SW22 is turned to the AC/DC converter circuit 32 in the equalization circuit including the storage battery module B2. In addition, the variable capacitors C1 and C2 are set such that the equalization circuits including the storage battery modules B1 and B2 have the same resonance frequency with each other.

At first, the storage battery module B1 discharges, and a current flows through the DC/AC converter circuit 21 to the transformer T1, and the current flows through the primary winding in a direction from top to bottom of FIG. 9. Since the secondary winding is configured in a flyback manner, a current flows through the secondary winding in a direction from bottom to top of FIG. 9, and the current flows through the secondary winding of the transformer T2 in an opposite direction from top to bottom. Since the equalization circuit including the storage battery module B1 and the equalization circuit including the storage battery module B2 have the same resonance frequency with each other, a current is induced in the primary winding of the transformer T2, which flows through the primary winding in a direction from bottom to top, which is opposite to the direction of the current in the secondary winding. Further, depending on the status of SW22, the current flows through the AC/DC converter circuit 32 to the storage battery module B2, and charge the storage battery module B2.

By performing the above-mentioned process for every storage battery module of every equalization group, it is possible simultaneously charge and discharge the plurality of equalization groups, and equalize the storage battery modules in a short time.

Embodiment 3

Figure 10:
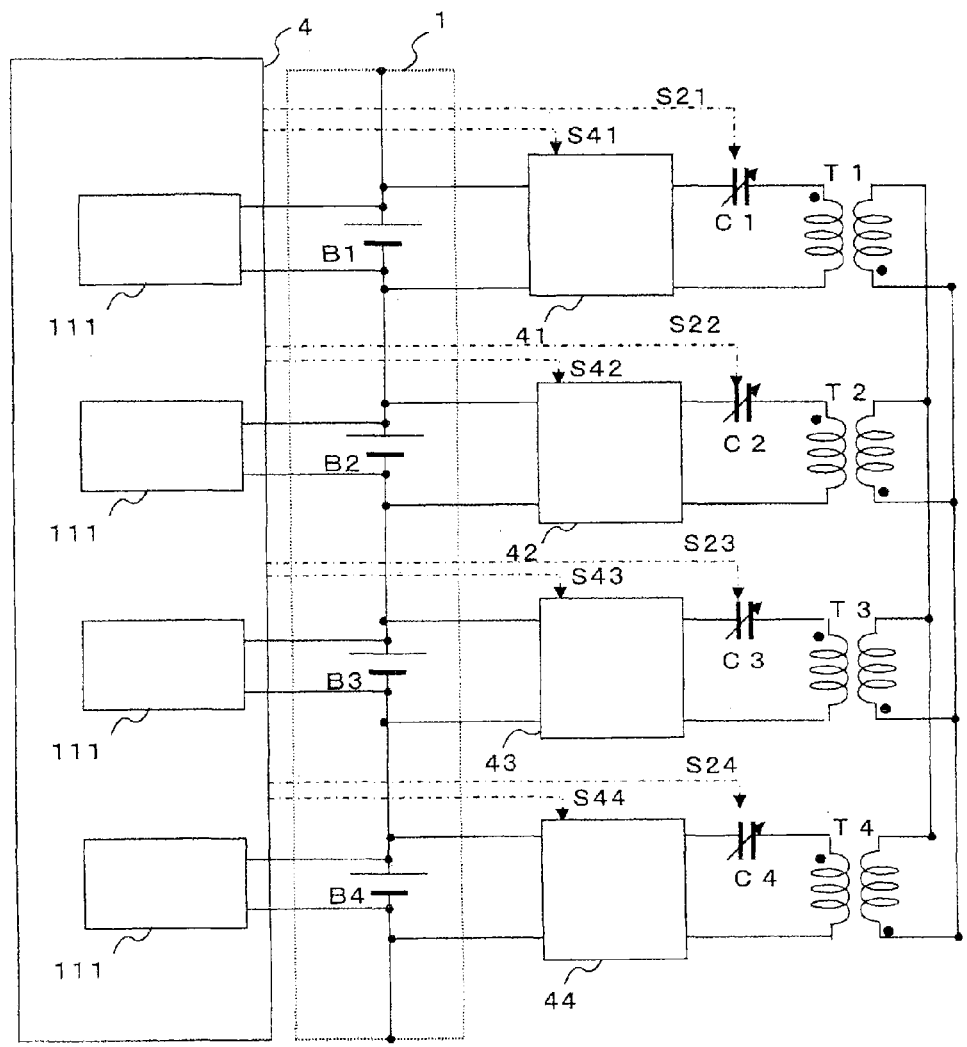
FIG. 10 is a drawing showing one example of a configuration of an equalization control unit according to Embodiment 3 of the present invention.

FIG. 10 is a drawing showing one example of a configuration of a storage battery equalization device according to Embodiment 3. The storage battery equalization device according to the present embodiment forms equalization groups based on the amounts of charge of the storage battery modules B1 to B4. In addition, DC/AC mutual converter circuits 41 to 44 mutually convert direct currents and alternating currents and adjust frequencies in a manner similar to that of the DC-AC mutual converter circuit 11 to 14 of Embodiment 1, and further, the DC/AC mutual converter circuits 41 to 44 adjust duty cycles of output voltages to adjust effective voltage values. That is, the DC/AC mutual converter circuit 41 to 44 differs from the DC/AC mutual converter circuits 11 to 14 of Embodiment 1 in that the DC/AC mutual converter circuit 41 to 44 has not only a feature of adjusting the resonance frequencies of the equalization circuits, but also a feature of adjusting the duty cycles of the output voltages.

The present embodiment is described for a case of a battery pack 1 including four storage battery modules B1 to B4 arranged in series. However, obviously, the number of the storage battery modules forming the battery pack 1, and the numbers of the storage battery cells forming each of the storage battery modules are not particularly limited.

Figure 11:
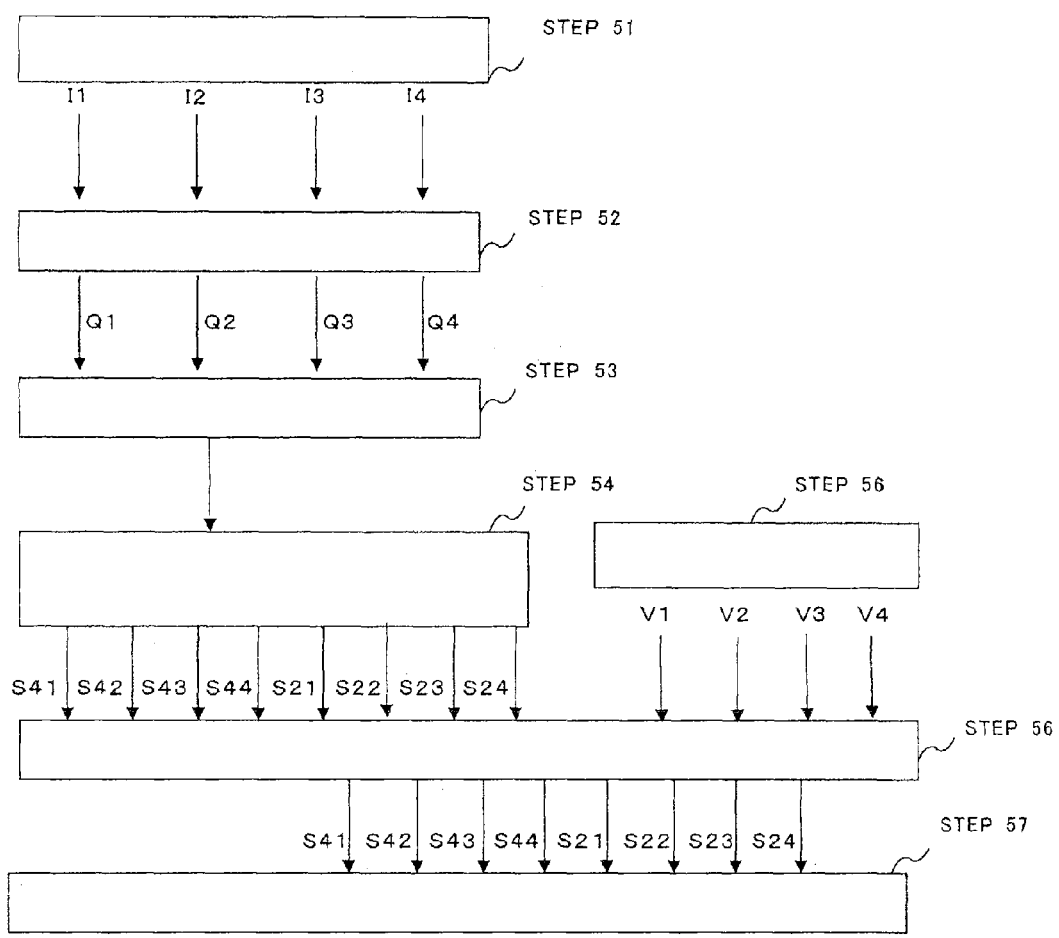
FIG. 11 is a flowchart showing operation of the equalization control unit according to Embodiment 3 of the present invention.
Figure 12:
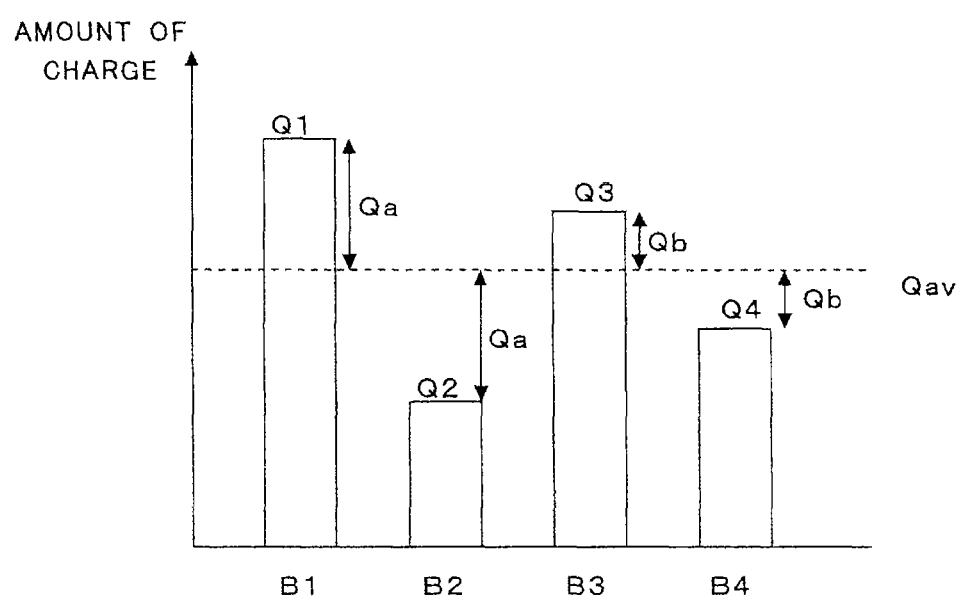
FIG. 12 is a drawing showing one example of relations among amounts of charge according to Embodiment 3 of the present invention.

With reference to FIG. 11, operation of the storage battery equalization device according to the present embodiment is described as follows. Input and output of signals according to the flowchart of FIG. 11 are indicated in FIG. 10 by dashed and dotted lines. At first, for each storage battery module B1 to B4, a current value is measured starting from when the storage battery is in a state that an amount of electric charge within the storage battery is known (Step 51), and an amount of residual electric charge is calculated based on an integral of the measured current value over time (Step 52). In Embodiments 1 and 2, the equalization groups for charging and discharging are formed based on the voltage values of the storage battery modules. On the other hand, in the present embodiment, the equalization groups for charging and discharging are formed based on the amounts of residual electric charge of the storage battery modules as shown in FIG. 12 (Step 53).

Subsequently, signals S41 to S44 for setting the resonance frequencies and the duty cycles for adjusting the effective voltage values to the equalization circuits including the storage battery modules belonging to the equalization groups are determined, and the equalization electrostatic capacitance signals S21 to S24 for setting the electrostatic capacitance values of the variable capacitors C1 to C4 for setting the same resonance frequency for each of the equalization groups are determined, and the determined signals are outputted to the DC/AC mutual converter circuits 41 and 44 and to the variable capacitors C1 to C4 (Step 54).

In general, an amount of maximum electric charge that a storage battery module can charge decreases due to deterioration of the storage battery module. In Embodiment 1, the output voltages are obtained for the storage battery modules, and the storage battery modules for charging and the storage battery modules for discharging are determined. That is, the equalization can be achieved by discharging the storage battery modules having a high output voltage and by charging the storage battery modules having a low output voltage charges. On the other hand, when the amounts of residual electric charge are used as references, the amounts of maximum electric charge to be charged are different for each storage battery cell, and different for each storage battery module, depending on deterioration conditions. Therefore, it is necessary to use, as a reference, a ratio of the amount of residual electric charge to the amount of maximum electric charge to be charged for each of the storage battery modules, and discharge the storage battery modules having higher ratios, and charge the storage battery modules having lower ratios. That is, it should be noted that electric charge is not necessarily moved from a storage battery module having a higher output voltage to a storage battery module having a lower output voltage.

Thus, on the basis of the ratio of the amount of residual electric charge to the amount of maximum electric charge to be charged, the duty cycles are adjusted for each of the storage battery modules to adjust the effective voltages. More specifically, the duty cycle are adjusted so as to increase the effective voltages corresponding to the storage battery modules having higher ratios of the amount of residual electric charge, and decrease the effective voltages corresponding to the storage battery modules having lower ratios of the amount of residual electric charge. The storage battery modules corresponding to the higher effective voltages can be used as the storage battery modules for discharging, and the storage battery modules having the lower effective voltages can be used as the storage battery modules for charging.

In order to prevent overcharging and overdischarging of the storage battery modules in a course of charging and discharging, it is important to measure the voltages of the storage battery modules (Step 55), and to monitor the voltages to prevent them from being equal to or higher than a predetermined voltage and from being equal to or lower than another predetermined voltage (Step 56). Such prevention of overcharging of overdischarging by measuring the voltages of the storage battery modules is necessary operation also in Embodiments 1 and 2. In Embodiments 1 and 2, the output voltages of the storage battery modules are monitored by the voltage monitors. On the other hand, in the present embodiment, the amounts of electric charge are obtained based on the current values of the storage battery modules for forming the equalization groups, and voltage monitors are not necessary for the process of charging and discharging. It should be particularly noted that the voltage monitors for monitoring overcharging and overdischarging are used as mentioned here.

The above-mentioned process is performed for every equalization group, it is possible to thus simultaneously charging and discharging the plurality of the storage battery modules, which belong to the plurality of the equalization groups (Step 57), and equalize the storage battery modules in a short time.

Embodiment 4

Figure 13:
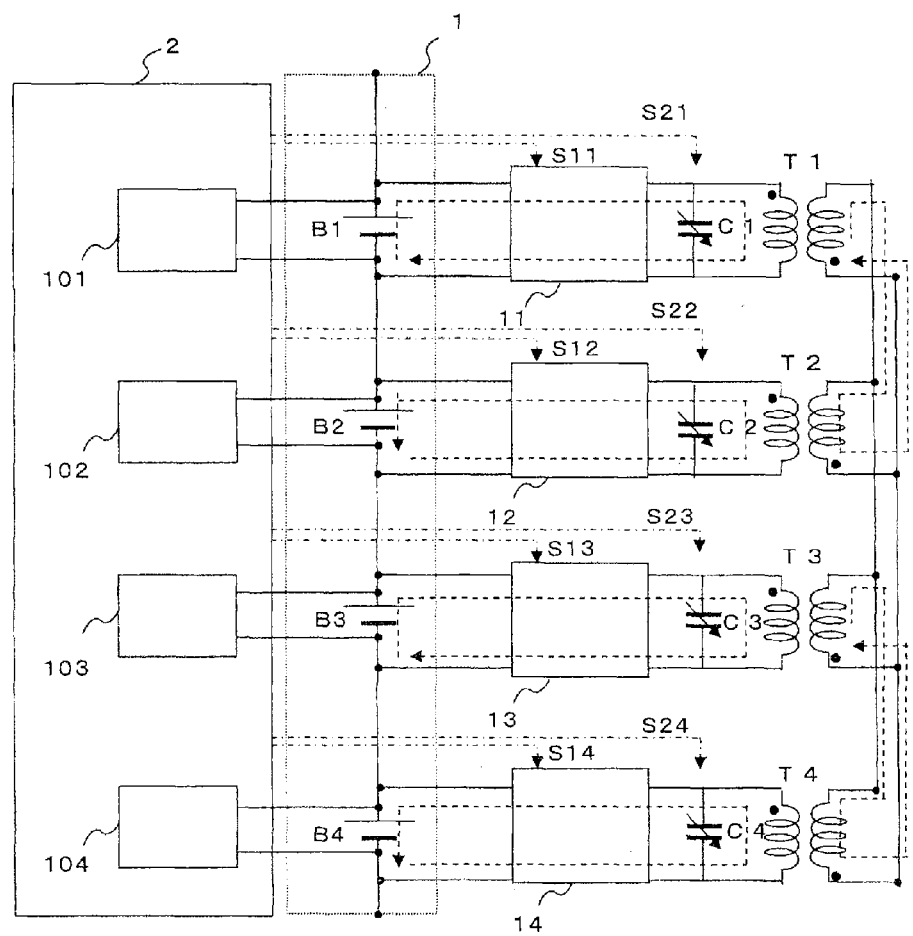
FIG. 13 is a drawing showing one example of a configuration of Embodiment 4 according to the present invention.

FIG. 13 is a drawing showing one example of a configuration of a storage battery equalization device according to Embodiment 4. The storage battery equalization device according to the present embodiment differs from the storage battery equalization device according to Embodiment 1 as follows. The storage battery equalization device according to Embodiment 1 is configured such that the primary windings of the transformers T1 to T4 are connected in series to the variable capacitors C1 to C4, respectively. On the other hand, the storage battery equalization device according to the present embodiment is configured such that the primary windings of the transformer T1 to T4 are connected in parallel to the variable capacitors C1 to C4, respectively.

In the case that the primary windings of the transformers T1 to T4 are connected in parallel to the variable capacitors C1 to C4, respectively, the resonance frequencies are also obtained by Equation (1) as mentioned above.

As described above, the configuration of the resonance circuits including the primary windings of the transformers T1 to T4 and the variable capacitors C1 to C4 is not limited to the configuration using series connection, and a configuration using parallel connection also provides the above-mentioned advantageous effects of the storage battery equalization device of Embodiment 1.

Embodiment 5

Figure 14:
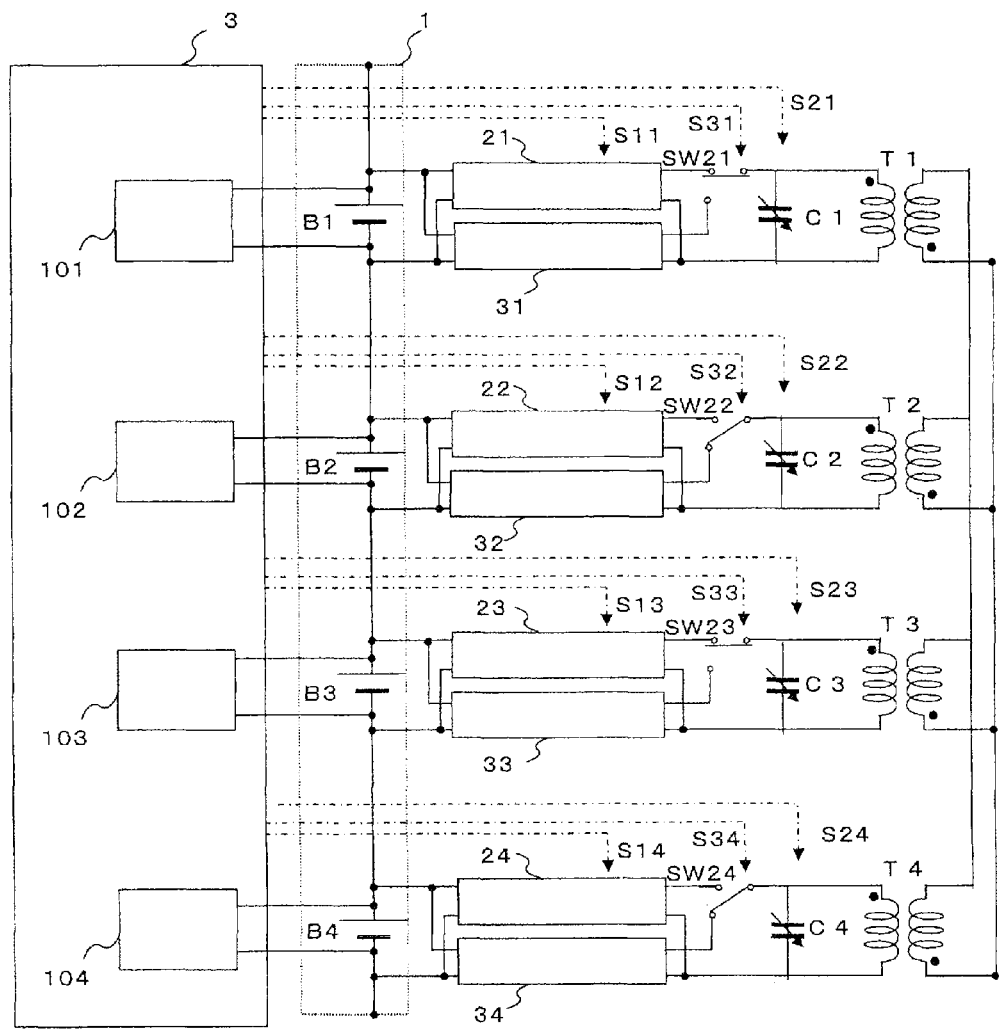
FIG. 14 is a drawing showing one example of a configuration of Embodiment 5 according to the present invention.

FIG. 14 is a drawing showing one example of a configuration of a storage battery equalization device according to Embodiment 5. The storage battery equalization device according to Embodiment 5 differs from the storage battery equalization device according to Embodiment 2 as follows. The storage battery equalization device according to Embodiment 2 is configured such that the primary windings of the transformers T1 to T4 are connected in series to the variable capacitors C1 to C, respectively. On the other hand, the storage battery equalization device according to the present embodiment is configured such that the primary windings of the transformers T1 to T4 are connected in parallel to the variable capacitors C1 to C4, respectively.

In the case that the primary windings of the transformers T1 to T4 are connected in parallel to the variable capacitors C1 to C4, respectively, the resonance frequencies are also obtained by Equation (1) as mentioned above.

As described above, the configuration of the resonance circuits including the primary windings of the transformers T1 to T4 and the variable capacitors C1 to C4 is not limited to the configuration using series connection, and a configuration using parallel connection also provides the above-mentioned advantageous effects of the storage battery equalization device of Embodiment 2.

Embodiment 6

Figure 15:
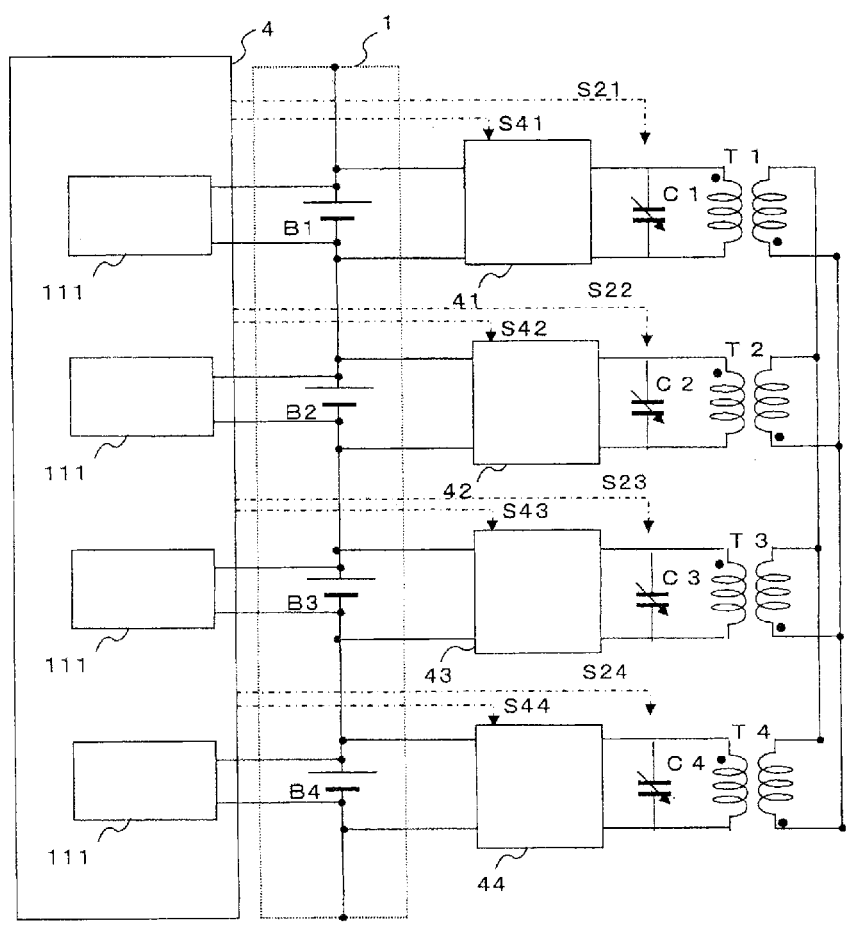
FIG. 15 is a drawing showing one example of a configuration of Embodiment 6 according to the present invention.

FIG. 15 is a drawing showing one example of a configuration of a storage battery equalization device according to Embodiment 6. The storage battery equalization device according to the present embodiment differs from the storage battery equalization device according to Embodiment 3 as follows. The storage battery equalization device according to Embodiment 3 is configured such that the primary windings of the transformers T1 to T4 are connected in series to the variable capacitors C1 to C4, respectively. On the other hand, the storage battery equalization device according to the present embodiment is configured such that the primary windings of the transformers T1 to T4 are connected in parallel to the variable capacitors C1 to C4, respectively.

In the case that the primary windings of the transformers T1 to T4 are connected in parallel to the variable capacitors C1 to C4, respectively, the resonance frequencies are also obtained by Equation (1) as mentioned above.

As described above, the configuration of the resonance circuits including the primary windings of the transformers T1 to T4 and the variable capacitors C1 to C4 is not limited to the configuration using series connection, and a configuration using parallel connection also provides the above-mentioned advantageous effects of the storage battery equalization device of Embodiment 3.

REFERENCE SIGNS LIST

1: battery pack; 2 to 4: equalization control unit; 11 to 14: DC/AC mutual converter device; 21 to 24: DC/AC converter circuit; 31 to 34: AC/DC converter circuit; 41 to 44: DC/AC mutual converter circuit; 101 to 104: voltage monitor; 111 to 114: voltage-and-current monitor; B1 to B4: storage battery module; C1 to C4: variable capacitor; T1 to T4: transformer; S11 to S14: equalization frequency signal; S21 to S24: equalization electrostatic capacitance signal; S31 to S34: equalization switching signal; S41 to S44: equalization duty cycle signal; V1 to V4: output voltage; I1 to I4: output current; SW1 to SW4: capacitor switch; Step 31: step of measuring output voltages; Step 32: step of determining equalization groups; Step 33: step of generating equalization signals; Step 34: step of discharging and charging; Step 41: step of measuring output voltages; Step 42: step of determining equalization groups; Step 43: step of generating equalization signals; Step 44: step of discharging and charging; Step 51: step of measuring currents; Step 52: step of calculating amounts of residual electric charge; Step 53: step of determining equalization groups; Step 54: step of generating equalization signals; Step 55: step of measuring output voltages; Step 56: step of monitoring overvoltage and overdischarge; Step 57: step of discharging and charging.

The invention claimed is:

1. A storage battery equalization device, comprising:
a battery pack including a plurality of storage battery modules connected in series, each of the plurality of storage battery modules including at least one storage battery cell;
a plurality of equalization circuits corresponding to the respective storage battery modules, each of the plurality of equalization circuits comprising a DC/AC mutual converter circuit connected in parallel to a corresponding one of the storage battery modules, a variable capacitor connected to the DC/AC mutual converter circuit, and a transformer having a primary winding connected in series or parallel to the variable capacitor;
external wirings interconnecting secondary windings of the transformers in parallel to each other;
voltage monitors, each of the voltage monitors being connected across both electrodes of a corresponding one of the storage battery modules; and
an equalization control unit that:
determines equalization groups based on voltage values measured by the voltage monitors, each of the equalization groups including one or more storage battery modules for discharging and one or more storage battery modules for charging,
for each of the equalization groups, sets one of electrostatic capacitance values to the variable capacitors of the equalization circuits connected to the storage battery modules belonging to the equalization group, the electrostatic capacitance values corresponding to resonance frequencies of the equalization circuits, the resonance frequencies being different for the equalization groups, and
controls a frequency of an alternating current outputted from the DC/AC mutual converter circuit of each of the equalization circuits, to be the resonance frequency of the equalization circuit.

2. The storage battery equalization device according to claim 1,
wherein the each of the equalization groups includes at least one storage battery module having a higher voltage than a reference voltage extracted by the equalization control unit, and at least one storage battery module having a lower voltage than the reference voltage, where the reference voltage is an average of the voltage values measured by the voltage monitors which are connected across the both electrodes of the respective storage battery modules belonging to each of the equalization groups.

3. The storage battery equalization device according to claim 2,
wherein the average of voltage values measured by the voltage monitors which are connected across the both electrodes of the respective storage battery modules belonging to each of the equalization groups is the same as the reference voltage.

4. The storage battery equalization device according to claim 1,
wherein each of the variable capacitors includes a plurality of capacitors, and a switch for selectively connecting the capacitors with each other, and
wherein each of the switches is controlled by a signal outputted from the equalization control unit to produce an electrostatic capacitance values.

5. The storage battery equalization device according to claim 1,
wherein each of the DC/AC mutual converter circuits comprises:
a DC/AC converter circuit that converts a direct current into an alternating current,
a AC/DC converter circuit that converts an alternating current into a direct current, and
a changeover switch that determines which of the DC/AC converter circuit and AC/DC converter circuit is to be selected, based on a signal outputted from the equalization control unit.

6. The storage battery equalization device according to claim 5,
wherein the voltage monitors measure voltages applied from the storage battery modules to the equalization circuits, respectively,
wherein in an equalization circuit to which a higher voltage than a reference voltage is applied, the DC/AC converter circuit is selected by the changeover switch,
wherein in an equalization circuit to which a lower voltage than the reference voltage is applied, the AC/DC converter circuit is selected by the changeover switch, and
wherein the reference voltage is an average of the voltage values measured by the voltage monitors which are connected across the both electrodes of the respective storage battery modules belonging to each of the equalization groups.

7. The storage battery equalization device according to claim 1,
wherein the equalization control unit outputs signals for setting duty cycles to the DC/AC mutual converter circuits, such that an output voltage of the DC/AC mutual converter circuit connected to a first storage battery module of the storage battery modules is lower than an output voltage of the DC/AC mutual converter circuit connected to a second storage battery module of the storage battery modules, the second storage battery modules being more charged than the first storage battery module.

8. The storage battery equalization device according to claim 7, wherein the equalization control unit calculates amounts of charge based on input and output currents of the storage battery modules.

* * * * *